Patented Jan. 18, 1938

2,105,911

UNITED STATES PATENT OFFICE 2,105,911

PURIFICATION OF PHTHALIC ANHYDRIDE

Harold B. Foster, Williamsville, N. Y., assignor to National Aniline & Chemical Company, Inc., New York, N. Y., a corporation of New York No Drawing. Original application January 21, 1926, Serial No. 82,857. Divided and this application June 17, 1931, Serial No. 545,075

18 Claims. (Cl. 260—123)

This invention relates to a method of purifying phthalic anhydride, particularly a crude or a partially purified phthalic anhydride which has been produced by the catalytic oxidation of naphthalene or other organic substance in the vapor phase.

In the production of phthalic anhydride by subjecting naphthalene or other suitable material in the vapor phase to partial or selective oxidation by means of oxygen or an oxygen-containing gas in the presence of a suitable catalyzer at an appropriate temperature, it is well known that the phthalic anhydride thus produced is usually contaminated with certain impurities such as, for example, maleic anhydride, maleic acid and other unsaturated acids, benzoic acid, quinones and like bodies, phthaleins, tar, naphthalene, etc., and some water. It has been heretofore proposed to separate the phthalic anhydride from this mixture by sublimation, particularly in a current of air. Such a procedure, however, is expensive to carry out since it is difficult, if not impossible, to obtain the greater part of the phthalic anhydride as a product which is uniform in character as to purity or texture, much of it must be re-sublimed, and each sublimation gives rise to a considerable loss in yield caused by the current of air carrying the product beyond the condenser or condensing chamber. Moreover, the sublimed and even re-sublimed material is usually still impure in that it ordinarily contains one or more volatile or sublimable impurities of the character above mentioned, it usually possesses an odor which is often unpleasant or undesirable, and the product as such or after exposure to diffused sunlight in the presence of air for a considerable time gives, when melted, a colored liquid. Of the impurities present, the quinones and related bodies, phthaleins and unsaturated aliphatic acids are especially persistent and difficult to remove, if not impossible, by heretofore known methods.

With ordinary distillation at atmospheric pressure of a crude or impure phthalic anhydride obtained in a catalytic way as above mentioned, it is found that the distillate is highly colored. It is sometimes possible to reduce and even temporarily remove the color by refluxing or autoclaving the crude or impure mixture prior to distillation. Distillation under a vacuum is ordinarily no more effective than at ordinary pressure. Slow fractional distillation gives a low yield. Moreover, the colorless products thus obtained upon exposure to diffused sunlight in the presence of air, e. g., two or more months, gradually become discolored or give, when melted, a colored liquid.

According to the present invention, phthalic anhydride, and particularly phthalic anhydride produced by catalytic processes in the vapor phase oxidation of naphthalene and the like, is purified by subjecting it to sublimation or to distillation, preferably the latter, in the presence of, or preferably preceded by a treatment with, a suitable agent or agents to form decomposition, oxidation or condensation products of, or with, the impurities. As such reagents, it has been found that sulfuric anhydride substances or compounds selected from the group consisting of sulfuric acid, oleum, and sulfur trioxide, and especially sulfuric acid, are particularly effective. Other condensing agents, such as zinc chloride, caustic soda, copper sulfate, inorganic acid sulfates and pyrosulfates, sodium plumbite, lead oxide, aluminum, zinc, tin, copper, etc., also effect an improvement in the character of the sublimate or distillate. There is thus obtainable in excellent yields a phthalic anhydride of higher purity and of a more uniform character than that obtained by other heretofore known methods, particularly known commercial methods.

The following specific example will further illustrate the invention, but it will be understood that the invention is not limited thereto. The parts are by weight.

*Example.*—There is charged into a reaction vessel about 30 parts of crude phthalic anhydride, obtained by the catalytic oxidation of naphthalene vapor with air, and approximately 1 to 2 parts of 66° Bé. sulfuric acid. The charge is heated under atmospheric pressure to a temperature of about 180°–285° C., preferably about 250° C., and maintained at this temperature for a period of about two to three hours or until the evolution of sulfur dioxide has nearly or substantially ceased. The molten mass is then run into a still which is provided with a fractionating column and a condenser, which parts, together with the associated pipe lines, are preferably jacketed. The mass in the still is then heated to the distillation temperature, which is about 285° C. at atmospheric pressure, and the associated parts and pipe lines are kept at a temperature above the solidifying point of the distillate during distillation to avoid their becoming clogged. The distillate is cooled to about 150° C. in the condenser, and it is preferably returned from the condenser to the still until it comes over as a clear water-white liquid product, after which it is collected in suitable containers or molds where it solidifies. The still is run until practically no more distillate is obtained, and it is brought to a high temperature near the end of the distillation to insure a substantially complete separation. The residue left in the still has the appearance of a fluffy, friable coke.

Toward the end of the distillation, the distillate may come over colored and is collected separately. It may be returned to a subsequent batch, if desired, thus preventing loss of material. Instead of permitting the liquid condensate from the condenser to return to the still until a water-white distillate is obtained, the liquid condensate may be fractionally collected and the colorless portion thereby separated from the colored portions; but this method is not ordinarily advantageous since the colored portions by continued treatment soon yield colorless distillates.

If, for any cause, the purified product is not sufficiently pure it may be re-subjected to the process of the invention for further purification.

A phthalic anhydride can be thus obtained which in the solid form is white in color, melts into a liquid that is clear and colorless, and has a melting-point of 130.5° C. or higher, e. g., around 130.8° C. On being exposed to diffused sunlight in the presence of air over a considerable period of time, e. g., two months or more, it undergoes substantially no change in color. It contains very little, if any, quinones or phthaleins, and not more than about one-quarter percent of unsaturated acids. It is completely soluble in hot water. Furthermore, the product because of its uniformity in composition can be accurately sampled.

The amount of sulfuric acid used depends upon the strength of the acid and the quality of the phthalic anhydride being treated. If the sulfuric acid is insufficient in amount, there is incomplete destruction of the impurities and a colored, usually yellow, distillate is obtained. Too much sulfuric acid apparently has no other effect than a loss in yield. Ordinarily, the amount of sulfuric acid employed is about 2 to 10 percent of the weight of crude phthalic anhydride treated, but more or less than this amount may be used.

The heating preliminary to the distillation may be effected in the still, though a separate reactor is preferred on account of the evolution of gases and economies in operation; and it is found that, if the preliminary heating period be too short or at too low a temperature, an incomplete separation and a yellow distillate results. For these reasons, a preliminary heating period of two hours or more at a temperature ranging from about 250° C. to the boiling point (about 285° C.) of phthalic anhydride is desirable.

The fractionating column aids in preventing the discoloration of the distillate. Without its use, some impurities are apparently entrained and a colored product is apt to result.

The action of the sulfuric acid appears to be mainly that of a condensing agent accompanied or followed by oxidation and carbonization of the impurities in view of the formation of sulfur dioxide and the coke that remains in the still. Whether a preliminary heating is desirable depends upon the character of the condensing agent employed or the gases or vapors that may result from the condensation and attendant reactions, but in the case of sulfuric acid or the sulfates, such preliminary heating results in producing an improved product, free from color. On the whole, as sulfuric acid has no apparent deleterious effect on the yield, and is readily available, inexpensive and in convenient liquid form, it is the preferred agent.

In the above example, instead of distilling the mass resulting from the treatment of the impure phthalic anhydride with sulfuric acid until the evolution of sulfur dioxide has nearly or substantially ceased, it may be sublimed in any well-known manner, for example, by cooling the mass to about 160°–170° C. and passing a current of air over or through it and condensing the sublimate in any suitable manner, for instance, by fractional condensation. The major middle portions of the sublimate are exceptionally pure.

The present invention contemplates the use of subatmospheric, ordinary or super-atmospheric pressures in the treatment of the impure phthalic anhydride with the condensing agent, or in the distillation or sublimation operation, or both. If in the above example, the distillation be carried out under reduced pressure, e. g., a gauge vacuum of about 25 to 30 inches of mercury, a phthalic anhydride substantially free from odor can be obtained.

Sublimation, according to the present invention, consists in the vaporization of material, e. g. phthalic anhydride, at or below its boiling point, and in the presence or absence of an inert gas, and the subsequent conversion or condensation of the resulting vapor directly to the solid state without passing through the liquid state, while distillation consists of the conversion of a substance at its boiling point from the liquid state to the gaseous or vapor state and the subsequent condensation of the resulting vapor or gas directly to the liquid state.

While the process has primarily in view the purification of a crude or a partially purified product obtained by the air oxidation of naphthalene by catalytic methods, it is generally applicable to impure phthalic acid and/or anhydride (herein referred to as "a phthalic acid substance") requiring the elimination of impurities, particularly impurities of the character above mentioned.

It may be pointed out that the various fractions as ordinarily obtained in the fractional condensation of the product produced in the catalytic oxidation of naphthalene may be separately or collectively purified by the process of the present invention.

In the claims, it will be understood that the term "catalytic phthalic anhydride" refers to and is limited to a phthalic anhydride which has been prepared by the partial or selective oxidation of an organic body, particularly naphthalene, in the vapor phase in the presence of oxygen or an oxygen-containing gas and a suitable catalyst.

This application is a division of my co-pending application Serial No. 82,857, filed January 21, 1926, now Patent No. 1,817,304.

I claim:

1. A process which comprises subjecting a substance selected from the group consisting of impure catalytic phthalic acid and impure catalytic phthalic anhydride to the action of a sulfuric anhydride substance selected from the group consisting of sulfuric acid, oleum and sulfur trioxide, distilling, and collecting the distillate.

2. A process of purifying phthalic anhydride which comprises heating impure catalytic phthalic anhydride with sulfuric acid, and subsequently distilling and collecting the distillate.

3. A process of purifying phthalic anhydride which comprises heating impure catalytic phthalic anhydride with the addition of a sulfuric anhydride substance selected from the group consisting of sulfuric acid, oleum and sulfur trioxide, until the evolution of sulfur dioxide substantially ceases, and distilling and collecting the distillate.

4. A process which comprises heating a substance selected from the group consisting of impure catalytic phthalic acid and impure catalytic phthalic anhydride with sulfuric acid until the evolution of sulfur dioxide substantially ceases, and then distilling and collecting the distillate.

5. A process of purifying phthalic anhydride which comprises heating impure catalytic phthalic anhydride with concentrated sulfuric acid until the evolution of sulfur dioxide substantially ceases, distilling and refluxing the product thus obtained until a colorless distillate is obtained, and then separately collecting the colorless distillate.

6. A process of purifying phthalic anhydride which comprises heating impure catalytic phthalic anhydride with about two to about ten percent of its weight of 66° Bé. sulfuric acid at a temperature of about 250° C. until the evolution of sulfur dioxide substantially ceases, then distilling and refluxing the mass thus obtained until a colorless distillate is produced, and condensing the distillate.

7. A process of purifying phthalic anhydride which comprises heating impure catalytic phthalic anhydride with concentrated sulfuric acid at a temperature of about 180° to about 285° C. until the evolution of sulfur dioxide substantially ceases, and distilling under subatmospheric pressure the product thus obtained.

8. In the production of a purified phthalic anhydride, the step which comprises heating an impure catalytic phthalic anhydride with sulfuric acid at a temperature of about 180° to about 285° C.

9. In the purification of phthalic anhydride, the step which comprises treating impure catalytic phthalic anhydride with a sulfuric anhydride substance selected from the group consisting of sulfuric acid, oleum and sulfur trioxide.

10. In the purification of phthalic anhydride, the step which comprises treating impure catalytic phthalic anhydride with concentrated sulfuric acid at a temperature of about 250° C.

11. A process which comprises subjecting a substance selected from the group consisting of impure catalytic phthalic acid and impure catalytic phthalic anhydride to the action of a sulfuric anhydride substance selected from the group consisting of sulfuric acid, oleum and sulfur trioxide, and vaporizing, removing and condensing the vapor, and collecting the condensate.

12. A process for the purification of phthalic anhydride which comprises heating impure catalytic phthalic anhydride with sulfuric acid, and subsequently vaporizing, removing and condensing the vapor, and collecting the condensate.

13. A process for the separation of phthalic anhydride from impurities which comprises heating impure catalytic phthalic anhydride with sulfuric acid and subsequently recovering phthalic anhydride from the mixture by vaporization, removal and fractional condensation of the vapor, and the separate recovery of the fractionated condensate.

14. A process for the purification of phthalic anhydride which comprises heating impure catalytic phthalic anhydride with sulfuric acid until evolution of sulfur dioxide substantially ceases, and recovering phthalic anhydride from the resulting mixture by vaporization, removal and condensation of the vapor, and collection of the condensate.

15. In the purification of impure catalytic phthalic anhydride by vaporization, removal and condensation of the vapors, and recovery of the condensate, the step which comprises preliminarily subjecting the impure phthalic anhydride to the action of hot concentrated sulfuric acid.

16. A process of purifying phthalic anhydride which comprises heating impure catalytic phthalic anhydride with about two to about ten per cent. of its weight of 66° Bé. sulfuric acid at a temperature between 250° C. and 285° C. for about two hours, distilling the resulting mass, condensing the distillate and returning the condensate to the mass until a colorless distillate is produced, and then recovering purified phthalic anhydride by fractional distillation.

17. The method of purifying catalytic phthalic anhydride which comprises subjecting it to heating in the molten state in the presence of concentrated sulfuric acid.

18. A method of purifying catalytic phthalic anhydride, which comprises subjecting the material to the action of sulfur trioxide and subsequently volatilizing the phthalic anhydride.

HAROLD B. FOSTER.